United States Patent [19]

Sharma et al.

[11] Patent Number: 5,171,511
[45] Date of Patent: Dec. 15, 1992

[54] TUYERE AND METHOD FOR DISCHARGING GAS INTO A FURNACE

[75] Inventors: Sudhir K. Sharma, Stormville; Ronald J. Selines, North Salem, both of N.Y.; Michael F. Riley, Danbury; Alan R. Barlow, Stamford, both of Conn.; Allen H. Chan, North Tarrytown; Paul J. Schaffer, Peekskill, both of N.Y.

[73] Assignee: Union Carbide Industrial Gases Technology Corporation, Danbury, Conn.

[21] Appl. No.: 626,524

[22] Filed: Dec. 12, 1990

[51] Int. Cl.$^5$ .................. C21C 5/52; C22B 9/21
[52] U.S. Cl. ........................ 266/47; 266/224; 266/270; 29/890.14
[58] Field of Search ........... 266/224, 270, 47; 373/85; 285/48, 50, 51, 52; 29/890.14

[56] References Cited

U.S. PATENT DOCUMENTS

| | | | |
|---|---|---|---|
| 4,110,599 | 8/1978 | Offerman | 137/341 |
| 4,302,496 | 11/1981 | Donovan | 428/196 |
| 4,699,654 | 10/1987 | Maddever et al. | 75/10.45 |
| 4,735,400 | 4/1988 | Tate et al. | 266/266 |
| 4,820,553 | 4/1989 | Sopchak et al. | 427/307 |

Primary Examiner—Melvyn J. Andrews
Attorney, Agent, or Firm—Peter Kent

[57] ABSTRACT

A tuyere and method for discharging an agitating gas into the molten contents of an electrically heated furnace to reduce temperature and composition variations in its contents. The tuyere comprises a refractory plug and sleeve for installation into the refractory wall and shell of the furnace, and a dielectric section in the tuyere pipe outside the furnace shell to prevent electrical arcing and current flow into the gas supply piping and external supports.

19 Claims, 2 Drawing Sheets

TUYERE AND METHOD FOR DISCHARGING GAS INTO A FURNACE

TECHNICAL FIELD

This invention relates to metal melting furnaces, particularly electric arc furnaces, a tuyere and a method for blowing gas into the furnace contents.

BACKGROUND

An electrically heated furnace is an enclosure in which electrical energy is used to produce high temperatures. An important type is the electric arc furnace in which scrap iron and steel is melted to produce ordinary steels, alloys and stainless steels. Typically the electric arc furnace has a cylindrical shell and dished bottom, both formed of steel plate and lined with refractory. The roof of the furnace is removable to allow charging of the furnace. After shredded scrap is introduced, the roof is swung back and lowered to close the furnace. Electrodes are lowered through holes in the roof until they contact the scrap charge. Electric current is then passed from one electrode down through an arc into the metal charge, then from the charge up through an arc to an adjacent electrode. The intense heat generated progressively melts the charge, and refining materials are added to provide a molten steel of desired composition. The furnace is tilted rearward to pour off slag and forward to pour out the metallurgically finished steel. If necessary, the furnace interior is repaired before the next heat is started.

The bottom or hearth of the furnace usually is a dished steel shape containing a lower layer and an upper layer of refractory. The lower layer, which can last for several years, is sometimes called the safety lining, and may be formed from several layers of brickwork. Over the safety lining, granular refractory material is rammed in until the desired bottom contour is formed. This upper layer lasts a number of heats and may be repaired as required.

While electrically heated furnaces can have just one electrode and use direct, single-, two- or three-phase current, furnaces for steelmaking usually have three electrodes and use three-phase current. Since the heating is localized around the electrodes, metal charge in the hearth remote from the electrodes melts later, and heat time is extended. The process consumes more energy and takes longer than would be otherwise necessary if the heating were more even throughout the furnace. Furthermore, stratification occurs in the composition as well as in the temperature of the furnace contents.

A method for increasing the heating and melting rate in an electric arc furnace is to agitate or stir the charge as it becomes molten. The agitation is often by discharging a gas, usually an inert gas, into the bottom or side of the furnace through a tuyere. Within the furnace, the tuyere typically comprises a refractory plug whose top surface is even with the furnace refractory surface. Problems, however, exist in practice.

Erosion or wear of the tuyere plug and the surrounding furnace refractory is accelerated by the agitation. As service time is accumulated and plug wear progresses, the gas discharge opening in the plug becomes increasingly susceptible to blockage. After pouring finished metal from the furnace, residual metal or slag may freeze over the opening. During patching of the working lining of the furnace between heats, patching material may inadvertently enter or deposit over the opening.

A further problem peculiar to the electric arc furnace arises from the high voltages and currents employed. Three phase voltage is supplied to the electrodes with the intent of maintaining the contents of the furnace at neutral. However, phase imbalance occurs at times causing an electric potential to develop in the furnace contents.

The furnace metal shell is grounded and electrically isolated by its refractory linings from the molten metal contents. However, in time, the refractory linings wear and crack, and their dielectric property degrades. Then if there is any phase imbalance, some electrical current may pass into the shell. With phase imbalance, electric current may flow through any conduction path in the tuyere plug into the tuyere piping and on into the tuyere external supports and gas supply piping. Arcing may also occur from any of these components to an adjacent surface at a lower potential, such as the furnace shell. The current flow in the tuyere plug may produce some electric heating in the plug thereby contributing to its deterioration.

The undesirability of electric current flow in tuyeres has been recognized and addressed by steelmakers. U.S. Pat. No. 4,735,400 to Tate et al describes a tuyere plug containing metal tubes for the passage and discharge of gas into the furnace interior. Within the plug, each tube is interrupted by a section of dielectric to prevent current flow in the tube. Such plug construction is costly and does not eliminate the possibility of electric current conduction through the plug refractory itself to the tuyere pipe. One of the most wear resistant of plug refractories, magnesia-graphite, has been determined to be conductive in the trials performed in evaluating the novel plug disclosed herein.

Accordingly, it is an object of this invention to increase the energy efficiency and shorten the time for heats in electrically heated furnaces.

It is an advantage of this invention that an economical, easily fabricatable, durable tuyere is provided with a long functional life and which does not arc in an electrically heated furnace.

It is a feature of this invention to have a dielectric interruption in the tuyere piping outside the furnace. It is another feature to have a tuyere plug with an integral sleeve, the plug and sleeve each being of selected wear resistance so as to maintain an even wear profile in the furnace interior surface.

SUMMARY OF THE INVENTION

This invention provides a durable tuyere for discharging a gas into the lower portions of an electrically heated furnace. The gas agitates and stirs the furnace contents thereby increasing melting rates and reducing temperature and composition gradients. The tuyere is comprised of a tuyere pipe around an end portion of which is formed an elongated plug of refractory of high inherent wear resistance. Within the plug are one or more passages for egress of gas from the pipe end to the upper plug end. Around the lateral surface of the plug is formed an integral sleeve of refractory of lesser inherent wear resistance than the plug refractory.

The plug with its integral sleeve is installed in the furnace with the plug bottom against the safety layer of furnace refractory. Around the sleeve is rammed granular refractory until the desired bottom contour is achieved. The tuyere pipe emerging from the plug bottom passes with clearance through a bore in the furnace safety refractory and furnace shell. The clearance between the tuyere pipe and the bore may be filled by additional refractory which is packed or poured into the clearance. Outside the furnace shell, the tuyere pipe contains a dielectric interruption to prevent electric current flow to the gas supply piping and arcing to adjacent surfaces.

The method provided by the invention comprises providing a refractory plug with a refractory sleeve having a lesser wear resistance than the plug, avoiding conductive contact between the tuyere pipe emerging from the plug and the furnace shell, and providing a dielectric interruption in the tuyere pipe outside the furnace shell.

DETAILED DESCRIPTION

Figure 1:
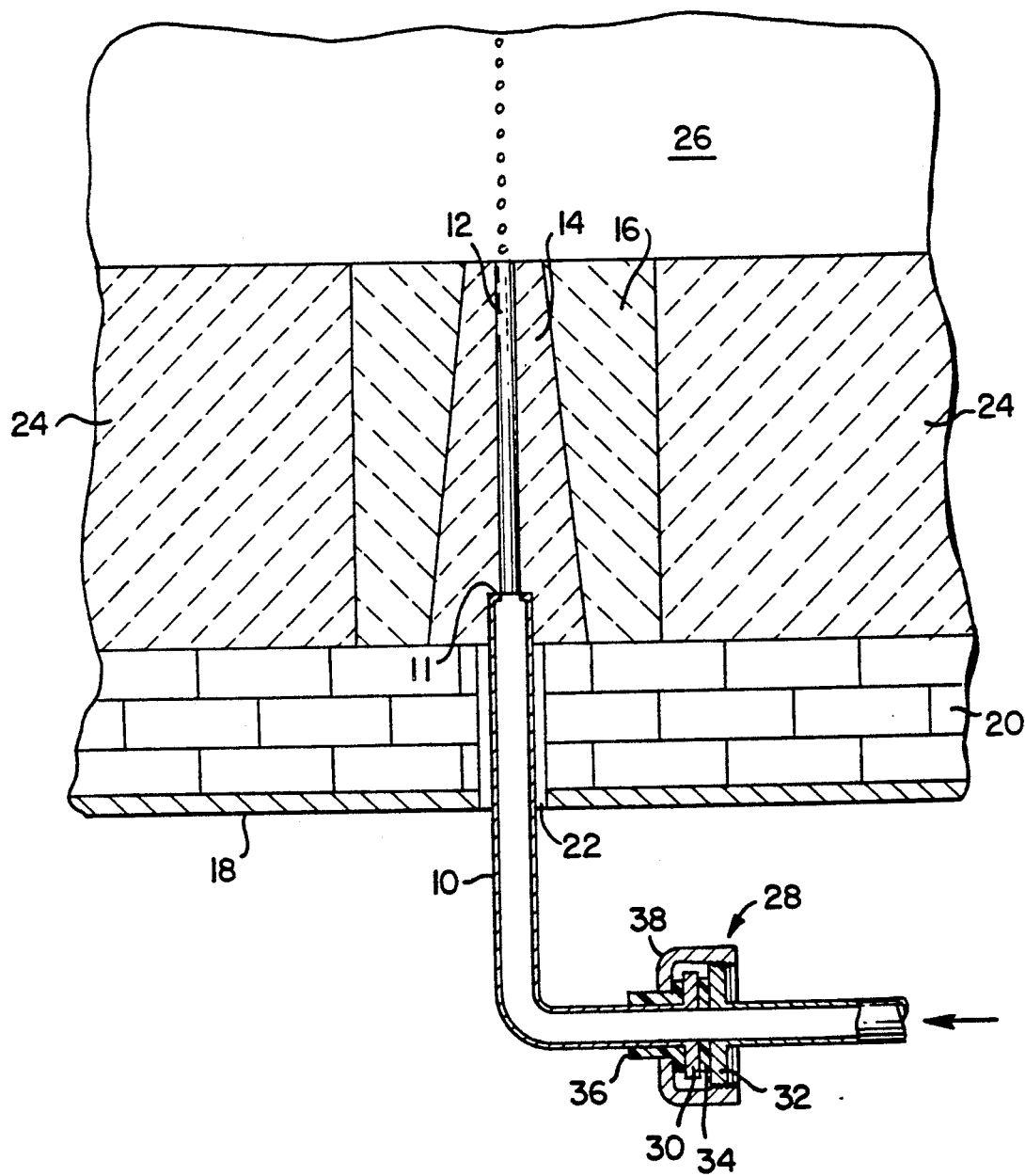
FIG. 1 is a cross-sectional view of a first embodiment of the novel tuyere provided by this invention shown installed in a section of a furnace bottom.

A first embodiment of the novel tuyere, depicted in FIG. 1, is comprised of a large diameter metal tube or pipe 10 into which a small diameter tube 12 is partially inserted and preferably joined. The joint may be as by a weld at the upper end 11 of the pipe. Alternatively, the small diameter tube 12 may extend downward within the pipe 10 for some short length and be joined, sealed, or attached to the pipe 10 in some conventional manner anywhere along their common length (not shown).

A generally cylindrical or frustoconical plug 14 of refractory, preferably fused grain magnesia-graphite, e.g., MgO-20% graphite, is pressed around the small tube 12 and a portion of the pipe 10. The upper end surface of the plug coincides with the upper end of the small tube. The upper end surface of the plug preferably has a somewhat smaller diameter than the lower end surface to prevent the plug from working up out of the upper furnace lining. Around the lateral surface of the plug 14 is cast a sleeve 16 of another refractory, preferably magnesia, i.e., MgO.

In an alternative construction of the plug, the small tube is not welded to the pipe. Hence after the plug is formed, the small tube may be withdrawn leaving a passageway for gas from the end of the pipe within the plug to the upper surface of the plug.

In another alternative construction of the plug, two or more parallel tubes 12 may be manifolded into the end 11 of pipe 10 by any conventional, compact, manifolding arrangement (not shown).

A furnace into which the tuyere plug 14 and sleeve 16 is installed typically has a metal shell 18 lined with a safety layer 20 of refractory such as refractory brick. To install the tuyere, the furnace shell 18 and safety refractory layer 20 are drilled to form a bore 22 with a diameter larger than the outside diameter of the tuyere pipe 10 emanating from the plug bottom. This pipe 10 is passed through the bore 22 in the furnace wall. The bottom end of the plug 14 and sleeve 16 rest against the upper surface of the safety refractory layer 20 in the furnace.

An expendable refractory 24 in granular form is then poured around the plug 14 and sleeve 16, and compressed by impact, e.g. ramming, to a level even with the top surface of the plug 14. The space between the bore 22 in the furnace wall and the tuyere pipe 10 may be filled by a mortar or by ramming in refractory material. Contact between the tuyere pipe 10 and the metal shell 18 of the furnace is avoided.

The function of the tuyere is to agitate or mix the furnace contents 26 by discharging a gas into the contents. The gas can be nonreactive, (i.e., inert) or reactive. The most intensive agitation occurs where the gas discharges, that is, at the top end of the plug. The agitation also increases the erosive or wearing action by the molten metal of the furnace surfaces. Expectedly, the severest wearing action occurs at the gas discharge point, and moderates with increasing radial distance from the point of discharge. Hence, the plug, most desirably, is formed from the most wear resistant refractory available. At a short distance from the gas discharge point, as at the sleeve location, a lesser wear resistant refractory is desirable so that the wear rates of the plug and sleeve in service are about equal. Therefore, the surface of the furnace interior remains relatively flat as service time accumulates and wear progresses. If the sleeve had the same wear resistance as the plug, the sleeve end would be worn away less and would become higher than the plug end. The refractory surface would assume a concave shape around the gas discharge point. Consequently, at the end of a heat when the furnace contents are poured out, some of the contents would have a greater tendency to remain in the concavity, solidify, and block the gas opening in the tuyere plug. Also in between heats when additional granular refractory is poured into the furnace to replace worn refractory, the additional refractory would have a greater tendency to accumulate in the concavity and block the gas opening in the tuyere plug.

Outside the furnace, the tuyere pipe 10 has a dielectric interruption. The dielectric is conveniently retained in a fitting 28 applied to the two ends of the interrupted pipe, namely a union, which can take many configurations. The union depicted in FIG. 1, for example, has, at the pipe interruption, a flange 30 on the downstream pipe end and a threaded flange 32 on the upstream pipe end. Between these flanges is interposed a dielectric gasket 34. On the downstream side of the downstream flange 30 is a dielectric collar 36 with an integral washer at its upstream end. Dielectric materials which can tolerate the temperatures of 300° F. to 600° F. near the furnace shell and which have a dielectric strength of 0.8 kilovolts per millimeter of thickness or greater are preferred. A dielectric material thickness of at least 0.8 millimeters is satisfactory and 1.5 millimeters is preferred in a furnace heated by electricity at 440 volts potential. A threaded annular cap 38 fits around the dielectric collar 36 and its washer, and, when screwed to the upstream flange 32, draws together the ends of the pipe thereby compressing the gasket 34 and the washer on the collar 36. A suitable material for the collar 36 is fiber glass cloth impregnated with phenolic grade silicone resin, and for the gasket 34, Kevlar (TM) with nitrile binder. To prevent gas leakage from the union during operation, the union is tightened when cold, heated to operating temperature (about 300° F.), and retightened when cold again. In service, the union is covered with fiberglass to protect against metal splash. The function of the dielectric section is to prevent any electric current flow from the tuyere to its external support or gas supply piping, or arcing to nearby surfaces at lower potential.

Figure 2:
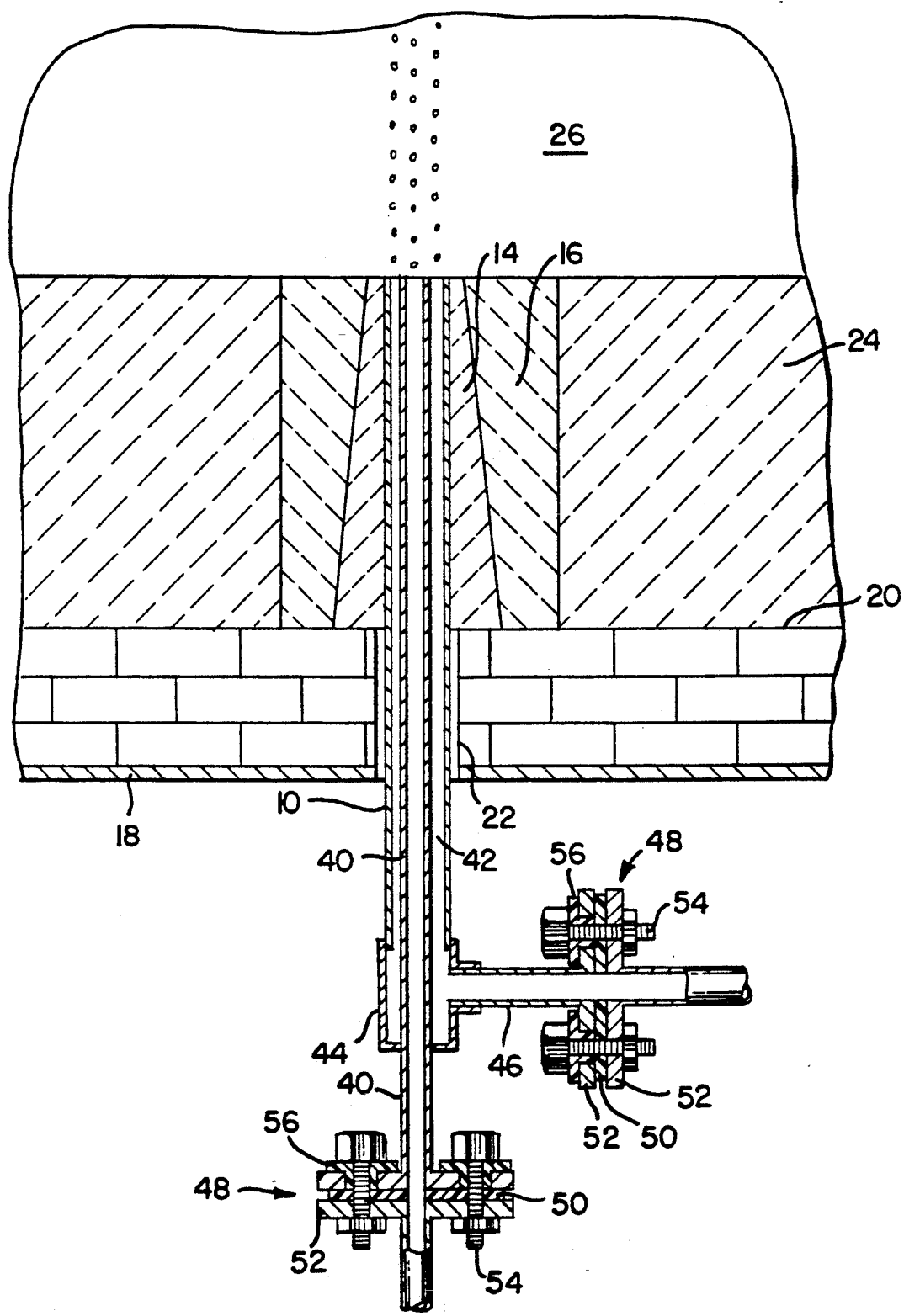
FIG. 2 is a cross sectional view of a second embodiment of the novel tuyere provided by this invention shown installed in a section of a furnace bottom.

In a second embodiment of the invention, depicted in FIG. 2, a similar plug and collar is used as in the first embodiment. However, the pipe 10 (or an equivalent larger outer tube) which enters the bottom of the plug 14 extends to the upper end of the plug and contains a small or inner tube 40. Different fluids may be supplied into the furnace through the inner tube 40 and the annulus 42 between the pipe 10 and inner tube 40. The inner tube 40 typically is concentric with the pipe 10, but not necessarily.

Outside the furnace, a manifold fitting 44 provides separate access for flow to the inner tube 40 and to the annulus 42 between the inner tube 40 and pipe 10. From the manifold fitting 44 emerge the small tube 40 and a pipe 46 or tube communicating with the annulus 42. A dielectric section 48 is provided in the tube 40 and in the pipe 10 emerging from the manifold fitting 44. The dielectric section 48 may take the form of a gasket 50 interposed between a pair of tube or pipe end flanges 52, which are bolted together. The bolts 54, of course, are insulated from at least one of the flanges in each pair, as by a dielectric collar 56 with an integral washer. Alternatively, a screw type union as described in the first embodiment may be employed.

Trials

Summarized in Table 1 are data regarding trials of various tuyere configurations used to inject nitrogen gas into the bottom of a 20-ton commercial electric arc furnace during a series of steelmaking heats. The furnace had three electrodes supplied with three-phase current at a maximum potential of 440 volts. In each trial the tuyere plug had a frustoconical shape about 18 inches long with a top diameter of 5 inches and a bottom diameter of 7 inches. Schedule 40, ¾ inch steel pipe protruded 3 inches into the plug. Emanating from the end of the pipe within the plug was a stainless steel tube with an outside diameter of 0.125 inches and a wall thickness of 0.028 inches. In all the trials, the plug was installed with its bottom resting on the top surface of the safety refractory lining as shown in FIG. 1. Working refractory was then poured into the furnace and rammed around the plug (or plug sleeve, if any) and against the safety refractory lining in the furnace.

In Trials 1-4 the tuyere pipe emerging from the bottom of the plug passed through a bore in the safety refractory and the shell of the furnace. The tuyere pipe emerging from the furnace shell was supported by a flanged joint, which was in turn supported by a 4-inch length of 2-inch diameter pipe welded perpendicular to the furnace shell. The shell was grounded.

In Trials 5-6, the pipe emerging from the bottom of the tuyere plug passed through a bore through the furnace shell and safety refractory lining. The free space in the bore was filled by a mortar. Grounding of the tuyere pipe to the furnace shell was avoided.

In all the trials, the agitating gas dispensed by the tuyeres was argon or nitrogen. The inlet gas supply pressure was adjusted between 40 to 100 psig to provide a continual, total flow of 7 scfm for the three tuyeres combined. The surface of the molten metal was observed. If a plume was observed emanating from the surface above a tuyere plug, the tuyere was considered functioning; i.e., stirring. If no plume was observed, the tuyere was considered not functioning even though gas may have been discharging from that tuyere plug. It had been shown that a tuyere must produce a plume for electrical supply consumption to be reduced in a heat.

In Trial 1, three cast magnesia tuyere plugs of identical configuration (without sleeves) were installed and served for 45 heats before being retired because of excessive wear. Of these, good agitation or stirring occurred in only 14 heats as determined from visual observation of the molten metal surface. One of the reasons for the rapid plug wear which occurred was believed to be the poor inherent wear resistance of the cast magnesia plug material. Heating by electric current passing through the metal tube in the tuyere plug into the gas supply piping may also have contributed.

Hence, in Trial 2, within each of the three magnesia tuyere plugs, the small metal tube was connected to and insulated from the pipe by a 2-inch long dielectric section of boron nitride tubing. The trial of this tuyere configuration was discontinued after 39 heats owing to plug wear. In about 36 of the 39 heats good stirring occurred from the tuyeres.

In Trial 3, one of the three tuyeres had a cast magnesia plug. Within this plug between the tube and pipe was a 2-inch long section of dielectric boron nitride tubing. In the two other tuyeres installed during Trial 3, the plug was pressed from fused-grain magnesia-20% graphite refractory, i.e., MgO-20%C, which has greater wear resistance than cast magnesia. No dielectric interruption was provided between the tube and pipe in these plugs. Around all three plugs in this trial was cast a sleeve with an outside diameter of 18 inches of castable magnesia. Thus the mean thickness of the sleeve was 6 inches.

In Trial 3 after 18 heats, arcing was observed in one of the tuyeres with a MgO-20%C plug. The arcing occurred outside the furnace between the flange on the tuyere pipe and the mating flange on the end of the 2 inch diameter support pipe, welded perpendicular to the shell. This tuyere pipe was then disconnected from the gas supply piping. The second MgO-20%C plug provided good stirring for 119 heats before arcing occurred. No arcing was observed in the tuyere with the cast magnesia plug containing the dielectric interruption. This plug survived 95 heats and provided good stirring during 61 of the heats.

In Trial 4, all three plugs were pressed from MgO-20%C and included a boron nitride dielectric interruption between the tube and pipe within the plug. Around each of these plugs was a cast MgO sleeve with an outside diameter of 18 inches. For 26 heats the tuyeres provided good stirring. However, after 33 heats, arcing occurred and the trial was discontinued. This trial confirmed that electrical current was conducted by the graphite in the plug material from the furnace contents to the pipe within the plug.

In Trial 5, the three pressed MgO-20%C plugs were all provided with a 2-inch-thick sleeve of pressed MgO-20%C. The tuyere pipe support system which created a conductive path to the furnace shell was abandoned. Instead, the tuyere pipe was supported by mortar packed between the tuyere tube and a bore through the furnace wall, as described earlier and depicted in FIG. 1. In addition, a dielectric interruption in the form of a union was provided in each tuyere pipe outside the furnace, as described earlier.

In Trial 5, no arcing was observed. The plug wear was low allowing the tuyeres to remain in service for 156 heats with their stirring action becoming more sporadic with time. Stirring was evident in 70 of the first 100 heats and in only 14 of the next 56 heats. An undesirable concave wear profile was observed on the plug and sleeve.

In Trial 6, three pressed MgO-20%C plugs with a cast sleeve of magnesia to an outside diameter of 18 inches were used. Also, a dielectric union was installed in each tuyere pipe outside the furnace shell. In service, plug wear rate was low, and the plug-sleeve wear profile was relatively flat. Stirring action was good for 95% of the heats. This trial was terminated after 113 heats.

Although several embodiments of the invention have been described herein with some particularity, such disclosures have been made by way of example, and it should be recognized that numerous changes in the details and arrangement of the apparatus and the process may be resorted to without departing from the spirit and scope of the invention as hereinafter claimed.

TABLE 1
TRIAL DATA

| Trial No. | Plug Mat'l | Sleeve Mat'l | Dielectric Location | Plug Wear | Arcing | Heats Stirred | Service Life Heats |
|---|---|---|---|---|---|---|---|
| 1. | cast MgO | none | none | high | none | 14 | 45 |
| 2. | cast MgO | none | plug | high | none | 36 | 39 |
| 3a. | cast MgO | cast MgO | plug | mod. | none | 61 | 95 |
| 3b. | pressed MgO—20%C | cast MgO | none | low | yes | 18 | 18 |
| 3c. | pressed MgO—20%C | cast MgO | none | low | yes | 87 | 119 |
| 4. | pressed MgO—20%C | cast MgO | plug | low | yes | 26 | 33 |
| 5. | pressed MgO—20%C | pressed MgO—20%C | outside | low | none | 84 | 156 |
| 6. | pressed MgO—20%C | cast MgO | outside | low | none | 107 | 113 |

What is claimed is:

1. A tuyere capable of being installed on a furnace having at least one electrode for electrical heating, said tuyere comprising:
    (a) a plug;
    (b) a pipe for conducting fluid to said plug; and
    (c) a dielectric section in said pipe so as to prevent electric current flow in and arcing from said tuyere.

2. The invention as in claim 1 where said dielectric section includes dielectric material having a dielectric strength of at least 0.8 kilovolts per millimeter of thickness and a thickness of at least 0.8 millimeters.

3. The invention as in claim 1 wherein said dielectric section is a union.

4. The invention as in claim 1 further comprising: said plug being adapted for retention in the lining of the furnace, said plug continuously enclosing a portion of said pipe and having egress means for fluid flow from the extremity of said pipe within said plug to a plug end surface adapted to face the furnace interior.

5. The invention as in claim 4 wherein said egress means is a tube.

6. The invention as in claim 4 wherein said egress means is at least two tubes manifolded into said pipe at the extremity of said pipe within said plug.

7. The invention as in claim 4 further comprising a sleeve continuously enclosing at least a portion of said plug and terminating even with said plug end surface adapted to face the furnace interior.

8. The invention as in claim 7 wherein said plug is pressed magnesia-graphite refractory and said sleeve is castable magnesia.

9. The invention as in claim 1 further comprising:
    (c) said plug being adapted for retention in the lining of the furnace, said plug continuously enclosing a portion of said pipe and having a passage for fluid flow from the extremity of said pipe to a plug end surface adapted to face the furnace interior; and
    (d) a sleeve continuously enclosing said plug to a length even with said plug end surface adapted to face the furnace interior;
    (e) said sleeve having a lesser wear resistance than said plug.

10. The invention as in claim 9 wherein said plug is pressed magnesia-graphite refractory and said sleeve is castable magnesia refractory.

11. The invention as in claim 1 further comprising an inner tube within said pipe, said inner tube having a dielectric section at a location external to the furnace.

12. The invention as in claim 1 further comprising an inner tube within said pipe, a manifold separating said inner tube from said pipe, said dielectric section located upstream of said manifold in said pipe, and a dielectric section located upstream of said manifold in said inner tube.

13. The invention as in claim 1 further comprising an inner tube within said pipe and a dielectric manifold separating said inner tube from said pipe, said dielectric manifold located external to said furnace.

14. A method for preventing electric current flow in and arcing from a tuyere capable of being installed on a furnace, having at least one electrode for electrical heating, said tuyere having a plug and a pipe for conducting fluid to said plug, said method comprising providing a dielectric section in said pipe so as to prevent electric current flow in and arcing from said tuyere.

15. The method as in claim 14 wherein said dielectric section is a union and said method further comprises tightening said union, heating said union to a temperature of at least 300° F., cooling said union to ambient temperature, and retightening said union.

16. The method as in claim 14 further comprising continuously enclosing a portion of said pipe with a plug having egress for fluid flow from the extremity of said pipe to a plug end surface adapted to face the furnace interior, said plug adapted for retention in the refractory lining of the furnace.

17. The method as in claim 16 further comprising continuously enclosing at least a portion of said plug with a sleeve terminating even with said plug end surface adapted to face the furnace interior.

18. The method as in claim 17 further comprising the step of providing said sleeve with a lesser wear resistance than the wear resistance of said plug.

19. A method for providing fluid into an electrically heated furnace comprising passing fluid from outside the furnace into the furnace through a tuyere having a pipe for conducting fluid into the furnace and a dielectric section in said pipe at a location external to the furnace.

* * * * *